No. 716,916. Patented Dec. 30, 1902.
H. V. MALOTT & C. K. TUGGLE.
CUT-OFF VALVE FOR GAS PIPES.
(Application filed Apr. 28, 1902.)
(No Model.)

WITNESSES:
Elizabeth A. Jordan
Geo. E. Few

INVENTORS
Hiram V. Malott
Charles K. Tuggle
BY Milo B. Stevens & Co
ATTORNEY

UNITED STATES PATENT OFFICE.

HIRAM V. MALOTT AND CHARLES K. TUGGLE, OF COLUMBUS, OHIO, ASSIGNORS, BY DIRECT AND MESNE ASSIGNMENTS, TO THE BUCKEYE SAFETY GAS VALVE COMPANY, OF COLUMBUS, OHIO, A CORPORATION.

CUT-OFF VALVE FOR GAS-PIPES.

SPECIFICATION forming part of Letters Patent No. 716,916, dated December 30, 1902.

Application filed April 28, 1902. Serial No. 104,976. (No model.)

*To all whom it may concern:*

Be it known that we, HIRAM V. MALOTT and CHARLES K. TUGGLE, citizens of the United States, residing at Columbus, in the county of Franklin and State of Ohio, have invented certain new and useful Improvements in Cut-Off Valves for Gas-Pipes; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to cut-off valves, and particularly to pressure-actuated cut-off valves for gas-pipes.

The object of the invention is to form a safety-valve which will remain open while the pressure is on and which will automatically close when the pressure falls and stay closed until manually opened again. The intent of the invention is to prevent asphyxiation or explosion by gas, which is liable to occur by a stop of the flow followed by a resumption thereof.

An embodiment of our invention is illustrated in the accompanying drawings, in which—

Figure 1:
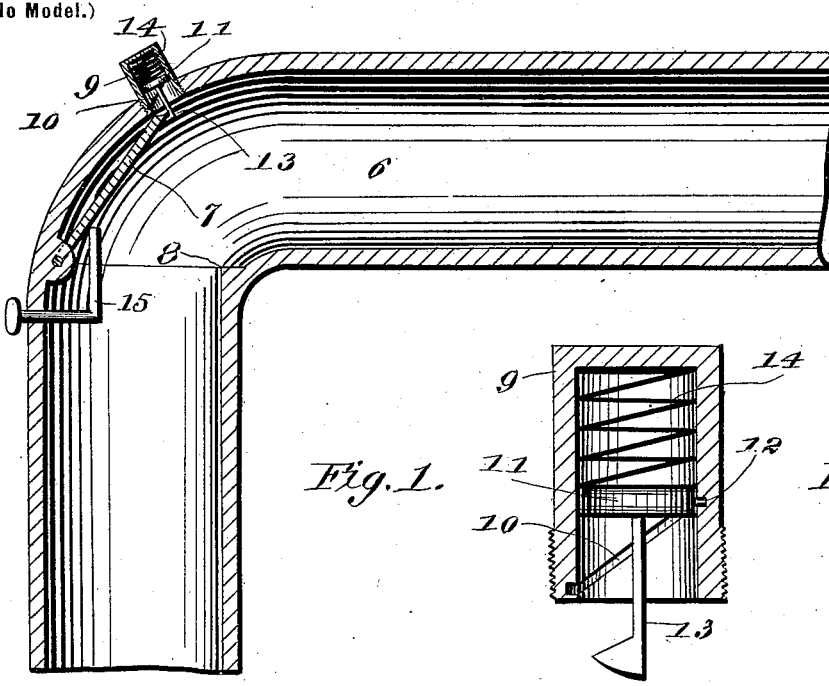
Figure 3:
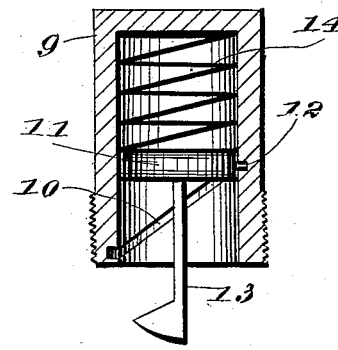
Figure 2:
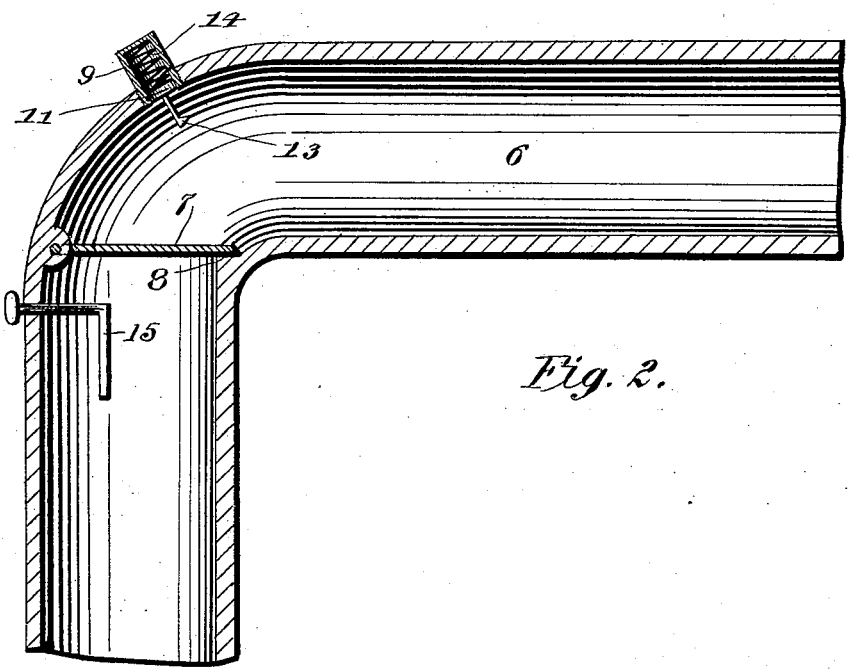

Figure 1 is a section showing the valve open. Fig. 2 is a similar view showing the valve closed. Fig. 3 is a longitudinal section of the cylinder holding the automatic catch for the valve.

Referring specifically to the drawings, 6 indicates the gas-pipe, which is provided with a flap-valve 7, which closes against a valve-seat 8 formed in the pipe. The valve is preferably located in a vertical pipe, so that it will close by gravity.

On the pressure side of the valve the pipe is tapped to receive the open end of a cylinder 9, the opposite end of which is closed. The interior of the cylinder has a spiral groove 10, extending half way around. A piston 11 slides in the cylinder, and the piston has a lug 12, which extends into the groove, so that when the piston slides it also turns. A catch 13 is fixed to and carried by the piston and extends beyond the mouth of the cylinder into the pipe in position to engage under the edge of the valve when the same is lifted and when the piston is forced in under pressure of the gas. Behind the piston is a spring 14, which opposes the gas-pressure with a force less than the normal pressure of the gas.

The catch is so attached to the piston that it engages under the edge of the valve only when the piston is forced in by gas-pressure to the end of the groove. When the pressure falls, the spring forces the piston out, which has the effect of turning the catch around and disengaging the valve, which thereupon falls and closes the pipe. If the pressure comes again, it only binds the valve the tighter; but it sets the catch so that it will again engage the valve when the latter is lifted by hand, as by an ordinary gas-pipe key 15. The catch is formed of spring metal, so that it will yield to allow the valve to snap thereunder.

What we claim is—

1. The combination with a pipe and a valve therein, of a pressure-actuated catch holding said valve from its seat, and a pressure-opposing spring connected to the catch to disengage the same from the valve when the pressure falls.

2. The combination with a pipe and a pressure-closed valve therein, of a pressure-actuated catch engaging said valve to hold it open, and a releasing-spring connected to the catch to disengage the same when the pressure falls.

3. The combination with a pipe and a normally closed valve therein, of a cylinder opening into the pipe adjacent the valve, a pressure-actuated piston therein having a catch extending into the pipe and engaging the valve to retain it in open position, and a pressure-opposing spring behind the piston actuating the same to disengage the catch when the pressure falls.

4. The combination with a pipe and a normally closed valve therein, of a spirally-grooved cylinder opening into the pipe adjacent the valve, a sliding and turning pressure-actuated piston in the cylinder having a lug projecting into the groove, a catch carried by the piston and engaging the valve, and a releasing-spring behind the piston actuating the same when the pressure falls.

In testimony whereof we affix our signatures in presence of two witnesses.

HIRAM V. MALOTT.
CHAS. K. TUGGLE.

Witnesses:
ALFRED B. CHILCOTE,
J. T. HAYES.